United States Patent
Humfeld et al.

(10) Patent No.: US 10,870,221 B2
(45) Date of Patent: Dec. 22, 2020

(54) GRADIENT TOOL SYSTEM FOR COMPOSITE PARTS

(71) Applicant: The Boeing Company, Chicago, IL (US)

(72) Inventors: Keith Daniel Humfeld, Federal Way, WA (US); Kelsi Hurley, Kent, WA (US)

(73) Assignee: The Boeing Company, Chicago, IL (US)

( * ) Notice: Subject to any disclaimer, the term of this patent is extended or adjusted under 35 U.S.C. 154(b) by 37 days.

(21) Appl. No.: 14/688,973

(22) Filed: Apr. 16, 2015

(65) Prior Publication Data

US 2016/0303808 A1 Oct. 20, 2016

(51) Int. Cl.
*B29C 33/38* (2006.01)
*B29C 70/44* (2006.01)
*B29L 31/30* (2006.01)

(52) U.S. Cl.
CPC .............. *B29C 33/38* (2013.01); *B29C 70/44* (2013.01); *B29K 2995/0012* (2013.01); *B29L 2031/3076* (2013.01)

(58) Field of Classification Search
CPC ..................................................... B29C 70/44
See application file for complete search history.

(56) References Cited

U.S. PATENT DOCUMENTS

| 6,217,000 | B1 | 4/2001 | Younie et al. | |
|---|---|---|---|---|
| 6,656,599 | B2 * | 12/2003 | Grossman | C23C 4/02 106/14.05 |
| 6,897,123 | B2 * | 5/2005 | Winther | H01L 21/2007 257/E21.122 |
| 7,968,021 | B2 | 6/2011 | Cleary, Jr. et al. | |
| 8,758,664 | B2 | 6/2014 | Astwood et al. | |
| 2009/0266870 | A1 * | 10/2009 | Yousefiani | B32B 7/02 228/112.1 |
| 2010/0266813 | A1 * | 10/2010 | Matviya | C04B 35/52 428/156 |
| 2011/0050265 | A1 * | 3/2011 | Hobbs | G01R 1/06761 324/756.03 |

FOREIGN PATENT DOCUMENTS

JP H11-123521 5/1999

OTHER PUBLICATIONS

Notice of Reasons for Rejection, with English translation prepared by the Japanese Patent Office in application No. 2016-050462, dated Mar. 10, 2020.

\* cited by examiner

*Primary Examiner* — Ryan M Ochylski
(74) *Attorney, Agent, or Firm* — McDonnell Boehnen Hulbert & Berghoff LLP

(57) ABSTRACT

A gradient tool for forming a part, the gradient tool comprising a first tool component comprising a first surface and a second surface. The first surface comprising a first material having a first coefficient of thermal expansion (CTE), and the second surface comprising a second material having a second CTE. The first CTE of the first material is different than the second CTE of the second material.

20 Claims, 5 Drawing Sheets

GRADIENT TOOL SYSTEM FOR COMPOSITE PARTS

FIELD

The present disclosure generally relates to methods and equipment for fabricating composite parts, and generally relates to a gradient tool system used in curing composite parts.

BACKGROUND

Composite parts may be cured within an autoclave that applies heat and pressure to the composite part during a cure cycle. Prior to cure, the composite part is typically laid up over a top surface of a tool. During autoclave heating, thermal mismatches or thermal stresses between the composite part and the tool on which the composite part is fabricated oftentimes generates thermal stresses that are locked into the part.

One of the reasons the composite part may warp is that the coefficient of thermal expansion (CTE) of the part and the CTE of the tool might be different. When the CTE of the composite part and the tool are different, the tool and the part may change shape at different rates causing the part to warp. In most situations, the tool is formed from a material having a CTE that approximately matches the CTE of the composite part in an attempt to reduce warping. However, such material is expensive and may not completely eliminate the warping.

Thermal stresses can also result in the bending of the composite part out of its engineering shape as the part cools to room temperature. As just one example, "spring-in" is a common manifestation of this, although "web rise" and twists are frequently observed as well depending on part geometry. When the composite part does not meet its desired engineering shape, shimming may be needed. Alternatively, in extreme cases, the part will be rejected and a new part must be manufactured. In certain known situations, composite part manufacturers may reject at least some of the parts they produce, which may up to double the manufacturing cost of certain composite parts.

In an attempt to reduce such thermal stresses, detailed modeling can be performed to design tooling that accounts for the warping of the part so that the part will warp from the tooling shape to the desired final shape. Certain modeling techniques are known that can be used in an effort to predict thermal stresses. However, the use of such modeling techniques have certain limitations. For example, running such an analysis is expensive and may take multiple weeks to perform. Invar (a specific composition of metal) tools, as well as composite tools, are available that come close to matching the CTE of the composite parts made on them. However, some such tools may be replaced frequently, depending on use. Invar is also expensive, as tools are frequently thousands of pounds. Both Invar and composite tools still may use tool surface compensation.

SUMMARY

In an arrangement, a gradient tool for forming a part is disclosed. The gradient tool comprising a first tool component comprising a first surface and a second surface, the first surface comprising a first material having a first coefficient of thermal expansion (CTE), and the second surface comprising a second material having a second CTE. The first CTE of the first material is different than the second CTE of the second material.

In an arrangement, the first CTE of the first material is lower than the second CTE of the second material.

In an arrangement, the gradient tool comprises a second tool component comprising a first surface, wherein the second tool component is formed from a third material having a third CTE. In an arrangement, the first surface of the second tool component comprises a geometrical surface structure similar to a geometrical surface structure of the first surface of the first tool component.

In an arrangement, the third CTE of the third material of the second tool component is substantially equal to the second CTE of the second material of the first tool component.

In an arrangement, the first tool component is formed integrally with the second tool component.

In an arrangement, the first tool component is coupled to the second tool component such that the second surface of the first tool component is adjacent a first surface of a second tool component.

In an arrangement, the first CTE of the first material of the first tool component is substantially equal to a fourth CTE of the part.

In an arrangement, the first surface of the first tool component has a geometrical surface structure to match a geometrical surface structure of the part.

In an arrangement, the second surface of the first tool component has a geometrical surface structure to match a geometrical surface structure of the part.

In an arrangement, at least one of a third material of a second tool component and the second material of the first tool component comprises aluminum.

In an arrangement, a method of manufacturing a composite part using a gradient tool comprising a first tool component is disclosed. The method comprising the steps of: laying up a composite part along a first surface of the first tool component of the gradient tool; sealing a vacuum bag over the composite part; drawing a vacuum in the vacuum bag so as to compact the composite part; heating the composite part to a predetermined temperature; changing a shape of the first surface of the first tool component at a first rate dependent on a first Coefficient of Thermal Expansion (CTE) of the first surface, and changing a shape of a second surface of the first tool component at a second rate dependent on a second CTE of the second surface, the second CTE of the second surface different than the first CTE of the first surface.

In an arrangement, the method further comprises the step of causing thermal stresses within the first tool component based on the different first CTE and second CTE of the first tool component.

In an arrangement, the method further comprises the step of compressing at least one compressible area defined by the first tool component so as to respond to the difference of thermal expansion between the first surface and the second surface of the first tool component.

In an arrangement, a method of fabricating a gradient tool comprising a first tool component is disclosed. The method comprising the steps of: configuring a first surface of the first tool component to interface with a bottom surface of a composite part; selecting a first material of the first surface of the first tool component, the first material having a first coefficient of thermal expansion (CTE); configuring a second surface of the first tool component to interface with a second tool component; and selecting a second material of the second surface of the first tool component wherein the second material has a second CTE. The second CTE is different than the first coefficient of thermal expansion of the first material.

In an arrangement, the method further comprises the step of: defining a desired tool inner mold line along the first surface of the first tool component.

In an arrangement, the method further comprises the step of: selecting the first material of the first surface of the first tool component, such that the first CTE of the first material is generally equivalent to a CTE of the composite part that is configured to interface with the first surface of the first tool component.

In an arrangement, the method further comprises the step of: selecting the second material of the second surface of the first tool component, such that the second CTE of the second material is generally equivalent to a CTE of the second component part.

In an arrangement, the method further comprises the step of: coupling the first tool component to the second tool component such that the second surface of the first tool component is adjacent the first surface of the second tool component.

In an arrangement, the method further comprising the step of: integrally forming the first tool component as one-piece with the second tool component.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings, wherein:

DETAILED DESCRIPTION

The embodiments described herein provide tools and methods that may reduce the adverse effects resulting from CTE differentials existing between a composite part and a tool. The herein-described tools and methods may reduce thermal stresses and strains occurring during a cure process of a composite part. The herein-described tools and methods may reduce the number or percentage of parts falling outside of desired tolerances and therefore reduce production costs. The tools and methods may also reduce the overall cost of a tool used for curing composite parts.

More specifically, the tools described herein include a face portion having a coefficient of thermal expansion (CTE) that varies from a CTE equal to the CTE of a base portion to the CTE of the part being made. This variation allows the surface of the tool contacting the composite part being made to have a CTE equal to the CTE of the composite part to prevent thermal stress between the part and the tool surface.

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

Figure 1:
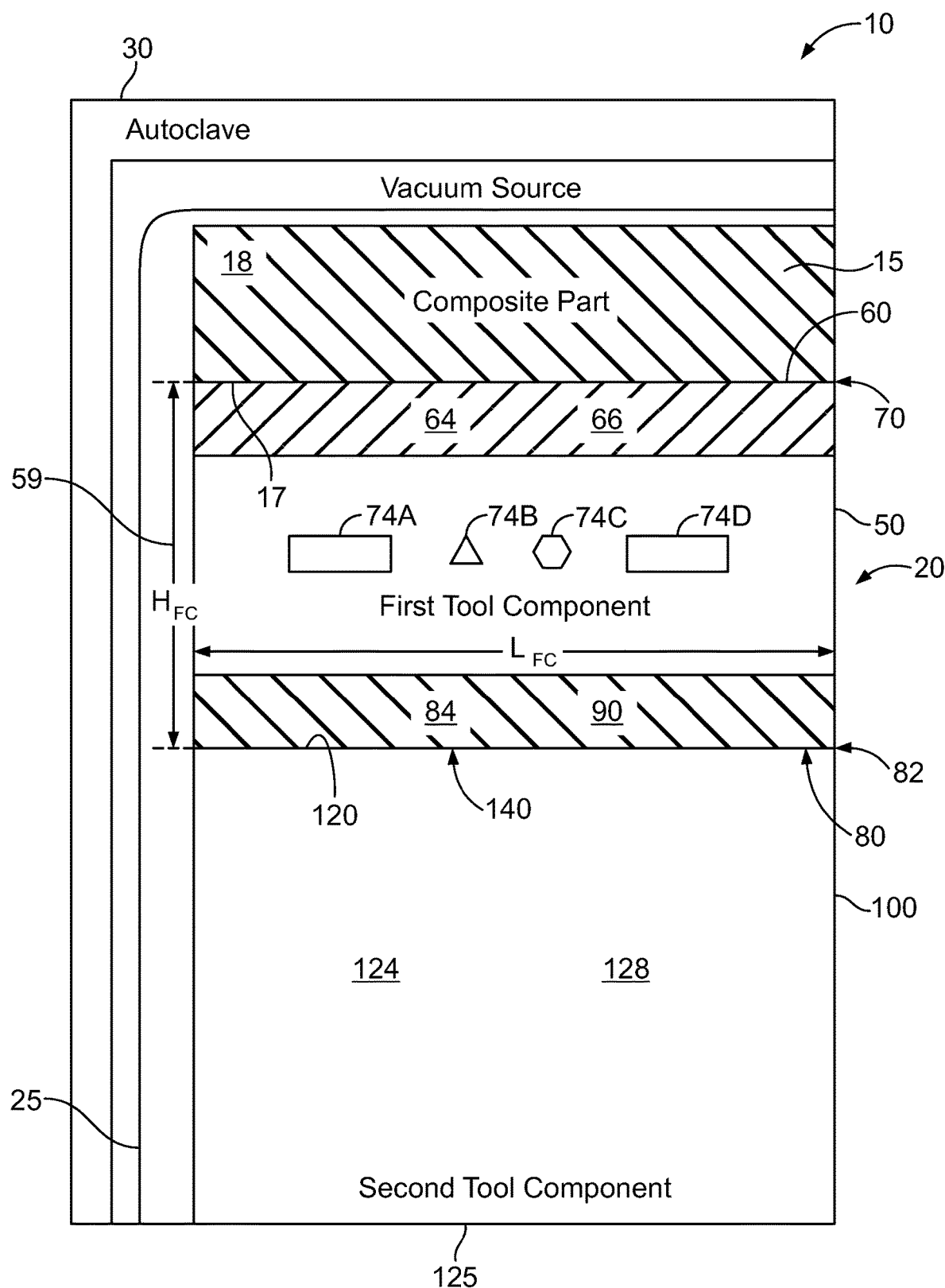
FIG. 1 is an diagrammatic representation of a functional block diagram of a gradient tool system according to disclosed embodiments.

FIG. 1 is a diagrammatic representation of a functional block diagram of a gradient tool system 10 according to disclosed embodiments. Such a tool system 10 may comprise an autoclave 30 and a gradient tool 20. Referring first to FIG. 1, an uncured composite part 15 may be supported by way of the gradient tool 20 within the autoclave 30. Specifically, the uncured composite part 15 may be cured on the gradient tool 20 placed in the autoclave 30 in which autoclave heat and pressure are applied to the uncured composite part 15. The uncured composite part 15 comprises a coefficient of thermal expansion (CTE) 18.

In this illustrated arrangement, the gradient tool 20 comprises two components: a first tool component 50 and a second tool component 100. In one preferred arrangement, these two components 50, 100 are coupled to one another. As illustrated, the first component 50 comprises a first surface 60 and a second surface 80. In this illustrated arrangement, the first surface 60 of the first tool component 50 comprises a surface that is located at a top of the first component 50 and the second surface 80 comprises a surface that is located at a bottom of the first component 50. However, as those of ordinary skill in the art will recognize, alternative first and second surface arrangements may also be used. As just one example, the first surface 60 could comprise a first side surface of the first component 50 while the second surface could comprise a second side surface of the first tool component 50.

As illustrated, the first surface 60 of the first tool component is configured to interface or support a bottom surface 17 of the composite part 15. Preferably, the first surface 60 comprises a desired tool inner mold line 70 for the composite part 15. As illustrated, both the first surface 60 of the first tool portion and a bottom surface 17 of the composite part 15 comprise planar geometrical surface structures. However, as those of skill in the art will recognize, other geometrical surface structures of the composite part, and of surface 17, and therefore the desired tool inner mold line 70 may also be used.

In this illustrated arrangement, the first surface 60 comprises a first material 64 wherein this first material 64 has a first coefficient of thermal expansion (CTE) 66. In one preferred arrangement, this first CTE 66 of the first material 64 is selected to be generally equivalent to a CTE 18 of the composite part 15.

Similarly, the second surface 80 of the first tool component 50 is configured to interface with the second tool component 100. A tool component interface 82 may be defined where the first tool component 50 interfaces with the second tool component 100. Specifically, in this illustrated arrangement, the second surface 80 of the first tool component 50 is configured to be coupled to a first surface 120 of the second tool component 100. As illustrated, the first surface 120 of the second tool component 100 comprises a top surface of the second tool component 100. However, as those of ordinary skill in the art recognize, alternative first and second surface arrangements may also be used. As just one example, the first surface 120 could comprise a first side surface of the second component 100. In this illustrated arrangement, the first tool component 50 is coupled to the second tool component 100 such that the second surface 80 of the first tool component 50 resides adjacent (i.e., in direct or indirect contact with) the first surface 120 of the second tool component 100.

In a preferred arrangement, the first tool component 50 comprises a non-homogenous portion and may be formed from various compositions. More specifically, the second surface 80 of the first tool component 50 is made from a different material than the first surface 60 of the first tool component 50 such that the CTE 90 of the second surface 80 matches a CTE of the second tool component 100. In addition, the CTE 66 of the first surface 60 of the first tool component 50 matches the CTE 18 of the part 15 being formed. As just one example, the second surface 80 of the first tool component 50 comprises an aluminum surface, and the first surface 60 of the first tool component 50 comprises an aluminum-nickel alloy, such as Invar. When placed in an autoclave and cured, such as the autoclave 30 illustrated in FIG. 1, the different CTE of the first and second surfaces 60, 80 of the first tool component 50 will cause thermal stress within the first tool component 50. Specifically, because the CTE 66 of the first surface 60 is different than the CTE 90 of the second surface 50, the first surface 60 and the second surface 80 will change shape at different rates (based on the different CTEs 66, 90) causing thermal stresses within the first tool component 50.

In one preferred arrangement, the second tool component 100 comprises a first or top surface 120 and a second or bottom surface 125. The first surface 120 is roughly (but preferably not exactly) the final shape of the part 15 in order to further reduce the cost of the second tool component 100. In one preferred arrangement, the first tool component 50 second surface 80 has the rough shape, and the face top portion has the exact shape of the part.

In one arrangement, the first tool component 50 may be fabricated by sputtering, additive manufacturing, or successive electroplating, and machining.

In this illustrated arrangement, the second tool component 100 comprises a rectangular prism configuration but alternative second tool component configurations may also be used. The first surface 120 of the second tool component 100 comprises a surface that comprises a rough structure of an inner mold line (IML) 140 that is generally similar to the desired tool inner mold line 70 of the first tool component 50. The second surface 125 of the second tool component 100 may have any type of geometrical surface structure.

This second tool component 100 could be made of any material 124. For example, the material 124 of the second tool component 100 may comprise a ceramic, a metal, a thermoset, a thermoplastic, a composite, or perhaps any combination thereof. Preferably, the material 124 of this second tool component 100 is selected and/or designed so that it can be manufactured in a cost effective manner. As just one example, the second tool component 100 may be produced by way of injection molding, additive manufacturing, or subtractive manufacturing. Low tolerance requirements of the rough IML surface face 140 of the second tool component 100 enables the use of inexpensive fabrication techniques while also reducing the overall manufacturing costs of the second tool component 100.

The first tool component 50 may comprise an atomic composition across its thickness (e.g., a metal and/or an alloy of metals). Such an alloy could be formed from several metals having compositions that are different from each other. For example, the first material 64 of the first surface 60 of the first tool component 50 may comprise a material having a CTE 66 that is similar to the CTE 18 of a particular composite part 15 undergoing fabrication. The CTE 66 of the first material 64 of the first surface of the first composite tool may be selected to be higher or lower than the CTE 90 of the second surface 84 of the first tool component 50. In addition, the first tool component 50 may comprise a second surface 80 that comprises a second material 84 having a CTE 90 that is similar to the CTE 128 of the material 124 of the second tool component 100. Accordingly, the first material 64 may have a different composition than the second material 84.

Advantageously, the first tool component comprises a CTE that varies along a portion of the first tool component. For example, the first tool component 50 comprises a coefficient of thermal expansion that varies along its height $H_{FC}$ 59 between the first and second surfaces 60, 80, respectively.

In order to achieve a thermal gradient within the first tool component 50, the first tool component may comprise an alloy formed of a plurality of metals with each metal having a different composition. As just one example, the first tool component 50 may comprise a first surface comprising Invar (36% Ni) or (38% Ni) which comprises a CTE that is closer to composite parts' CTE than Aluminum does. So, in one exemplary first tool component, the gradient may comprise an Aluminum second surface and an Invar first surface.

In one arrangement, the second component 100 comprises a homogenous second tool component and may be manufactured from a material selected based mainly on cost. For example, the second tool component 100 may be formed from aluminum or an aluminum alloy.

The first surface 60 of the first tool component 50 may match the rough structure of the IML 140 of the surface 120 of the second tool component 100. In this illustrated arrangement, the IML 70 of the first tool component 50 is defined by the first surface 60 upon which the composite part 15 is laid up or placed upon. The second surface 80, or the bottom surface, of the first tool component 50 may have a geometrical surface structure that matches the desired tool IML at its other surface 60, or top surface. As such, this first tool component 50 can be referred to as "a gradient tool component". That is, the first tool component 50 comprises a gradient CTE between the first surface 60 (i.e., the desired tool inner mold line 70) and the second surface 80. Specifically, this gradient CTE of the first component 50 provides a gradient change in the value of a CTE along a dimension of the first tool component 50. For example, in this illustrated arrangement, the first tool component 50 provides a gradient change in the value of the CTE along a height $H_{FC}$ 54 of the first tool component 50. Exemplary gradient changes may comprise step intervals (e.g., constant or non-constant step intervals), sinusoidal changes, logarithmic changes, and/or exponential changes.

Figure 2:
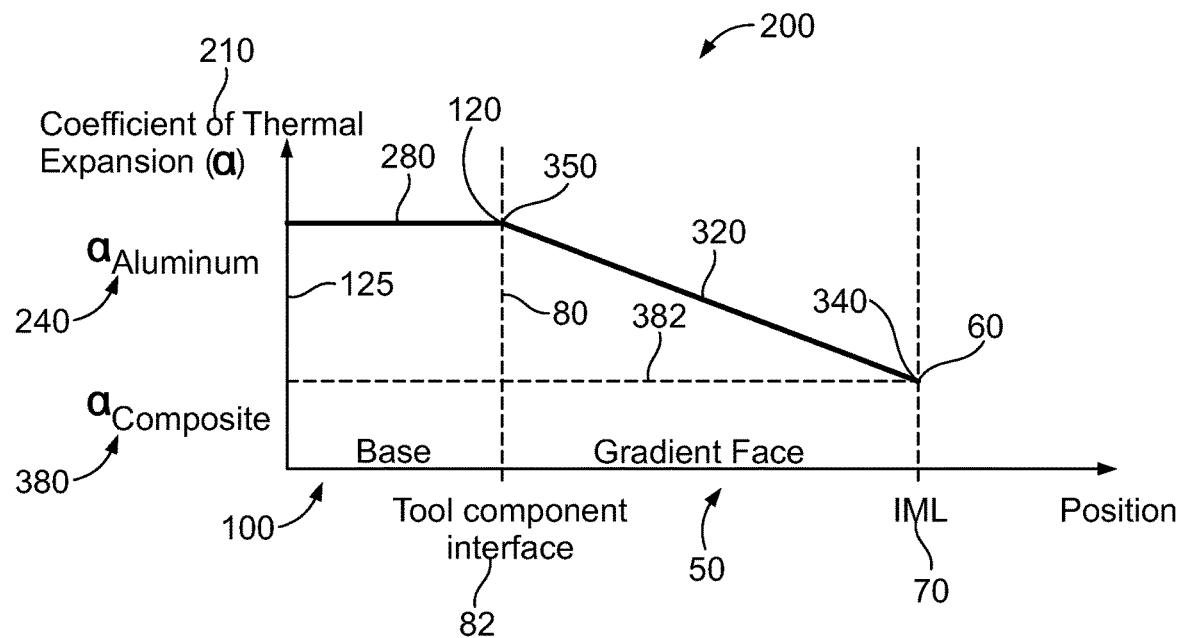
FIG. 2 is diagrammatic representation of a plot of coefficient of thermal expansion (CTE) over tool position for an embodiment of an exemplary gradient tool, such as the gradient tool disclosed herein.

FIG. 2 is a diagrammatic representation of one example of a plot 200 of coefficient of thermal expansion (CTE) 210 for the gradient tool 20 illustrated in FIG. 1. As illustrated, the second tool component 100 (also referred to herein as a "base") is provided. In this illustrated arrangement, the base 100 comprises aluminum. This aluminum base 100 has a CTE $\alpha_{Aluminum}$ 240. Therefore, the CTE $\alpha_{Aluminum}$ 240 is constant from the first surface 120 of the aluminum base 100 to the second surface 125 of the aluminum base. This CTE $\alpha_{Aluminum}$ 240 is graphically represented by a line 280 provided in the plot 200 of FIG. 2.

At the first surface 120 of the aluminum base 100, the base 100 is coupled to the first tool component 50 which in this arrangement comprises a gradient face portion (this gradient face portion is same as first tool component 50 illustrated in FIG. 1). As noted in FIG. 2, the tool component interface 82 is defined where the first tool component 50 interfaces with the second tool component 100. The gradient face portion comprises a CTE 320 that varies linearly from the second surface 80 of the gradient face component (i.e., the tool component interface 82) to the first surface 60 of the gradient face component. More specifically, the gradient face portion 50 comprises a CTE $\alpha_{Aluminum}$ 350 at the second surface 80 of the gradient face component 50 that matches the homogenous CTE 280 of the base component: CTE $\alpha_{Aluminum}$. In addition, the gradient face portion 50 comprises a CTE 340 at the first surface 60 of the gradient face component 50, such as CTE $\alpha_{Composite}$ 380. The CTE $\alpha_{Composite}$ 380 is represented by the dashed line 382 in FIG. 2. This CTE 340 is designed or selected to match the CTE 380 of a composite part 15 laid up on the second surface 60 of the gradient face 50.

As those of skill in the art will recognize, alternative gradient tools comprising alternative CTE gradients may also be used. As just one example, the second tool component 100 may have a non-homogenous base component with a CTE 280 that varies between the first surface 120 and the second surface 125. In an alternative arrangement, the second tool component 100 may comprise at least two types of metals, with each metal having a different CTE.

In yet another alternative arrangement, the first tool component 50 may comprise three or more materials.

In one arrangement, the first tool component 50 may be formed integrally as one-piece with the second tool component 100. For example, the first tool component 50 may be grown on the second tool component 100. Alternatively, the first tool component 50 could be formed separately from the second tool component 100 and then coupled to the second tool component, such that the second tool component 100 acts as a base portion for the gradient tool 50. Examples of coupling the first tool component 50 to the second tool component 100 include but are not limited to: using gravity, thermal lock, snap lock, adhesive, gluing, and bonding.

Preferably, the first tool component 50 is removably coupled to the second tool component 100. One advantage of such a gradient tool construction is that when the separate first tool component is coupled to the second tool component, the first tool component can be replaced without having to replace the second tool component. Such a feature is advantageous when new materials having CTEs that are a better match for the part being formed become available or when a different composite (with a different CTE) is being tested and/or processed on the tool because only the first tool component 50 will need to be switched out, rather than the entire gradient tool 20. In the testing situation, the first tool component can be switched out to another first tool component having a top surface CTE matching the CTE of the test composite, then switched back again to return to making parts from the usual composite.

The first tool component 50 may or may not comprise one or more compressible areas 74. The first tool component 50 may comprise compressible areas 74 to relieve the stress by being compressible relative to the tool. Such compressible areas 74, which may be open or closed cells and may or may not contain a gas (e.g., air), are generally highly compressible relative to metal. The compressible areas 74 may also contain other highly compressible materials as well. The placement and orientation of such compressible areas 74 could be designed and engineered in order to respond to the difference of thermal expansion between the different materials used for the first surface 60 and the second surface 80 of the first tool component 50 without absorbing all of the difference as tool-internal strain during a cure. Such compressible areas 74 may be provided in a uniform manner along a dimension of the first tool component 50, such as the length and/or width. Alternately, such compressible areas 74 may be provided in only certain portions of the first tool component 50. In yet another alternative arrangement, such compressible areas 74 may comprise the same or different geometrical shapes and/or configurations as each other based on the structure and overall shape of the composite part 15 being cured.

For example, and as illustrated in FIG. 1, the first tool component 50 comprises a plurality of compressible areas 74A-D having different geometrical shapes. As illustrated, the plurality of compressible areas 74A-D are evenly spaced along the same plane and along a length $L_{FC}$ 88 of the first tool component 50. However, compressible area arrangements may be provided wherein the location and number of compressible areas 74 may be a function of the final shape of the composite part 15 to be cured. The arrangements and/or orientations of the compressible areas 74 may also be a function of the composition of or the materials used for the first and second surfaces 60, 80 of the first tool component 50. In addition, arrangements and/or orientations of the compressible areas 74 may be a function of the type of material used in the first or base component 100.

As discussed herein, in one preferred arrangement, the first surface 120 of the second tool component 100 will match the IML 70 of the first tool component 50 so that the first tool component 50 and the second tool component 100 may be coupled to one another. As just one example, the first and second tool components may be coupled by way of an adhesive (e.g., a synthetic bonding agent) or a glue (e.g., a naturally occurring bonding agent). If coupled to one another by an adhesive or glue, this would allow the first tool component 50 to be replaced with a replacement first tool component so as to extend the life of the second tool component. Also, the ability to switch out the first tool component allows the use of a different material for selection of the second or bottom surface 80 of the first tool component 50. Other methods of coupling the two tool components 50, 100 together include the use of gravity or the use of one or more snap locks or snap fits. Alternatively, a thermal lock could be used to couple the first and second components 50, 100 together. That is, the two portions may be coupled together at elevated temperatures. As those of skill in the art will recognize, a combination of these types of coupling mechanisms may also be used. Moreover, being able to switch out the face portion (e.g., first tool component 50), allows selection of different face portions to match different composite materials having a different CTEs without having to purchase or design/fabricate a new base portion.

Figure 3:
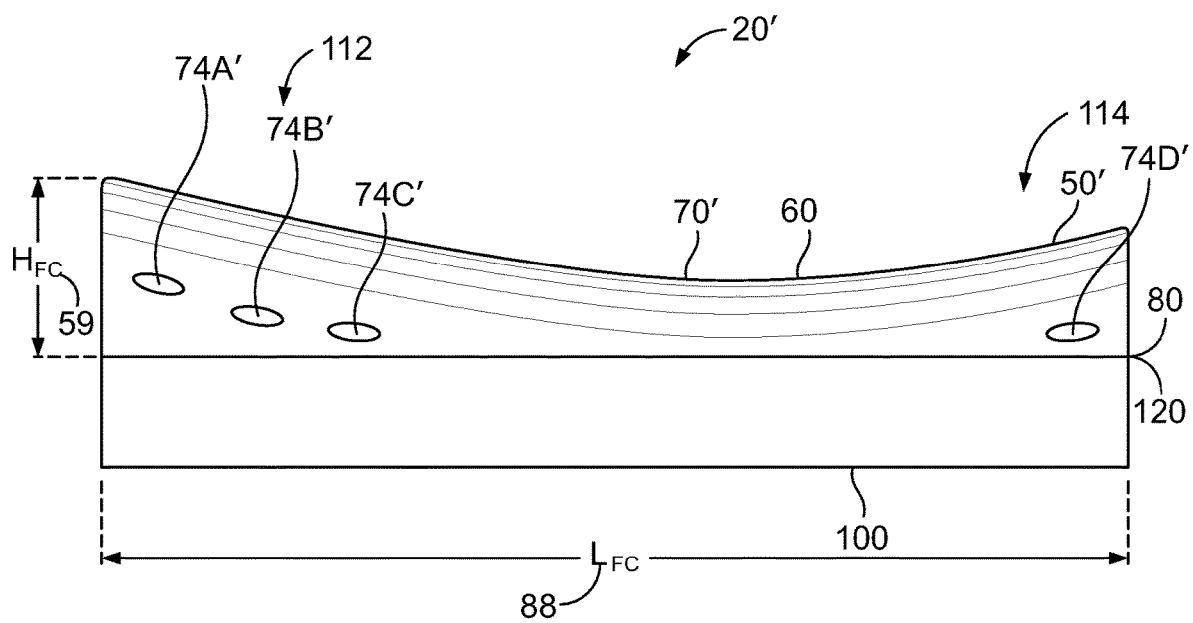
FIG. 3 is a diagrammatic representation of a gradient tool that may be used in a gradient tool system, such as the gradient tool system disclosed herein.

FIG. 3 is a diagrammatic representation of an alternative gradient tool 20' that may be used in a gradient tool system, such as the gradient tool system 10 illustrated in FIG. 1. Similar to the gradient tool 20 illustrated in FIG. 1, the alternative gradient tool 20' comprises two components: a first tool component 50' and a second tool component 100. As such, like elements from FIG. 1 are represented with like reference numbers in FIG. 3.

In this illustrated arrangement, the first tool component 50' of the gradient tool 20' is coupled to the second tool component 100, which acts as a base component for the gradient tool 20'. As illustrated, the first component 50' comprises a first surface 60 and a second surface 80. In this illustrated arrangement, the first surface 60 of the first tool component 50' is located at a top of the first component 50' and the second surface 80 is located at a bottom of the first component 50'. However, in alternative arrangements, the first surface 60 may comprise a different surface, such as a side surface or a bottom surface of the first component 50'. As also illustrated, the first tool component 50' comprises a non-constant height $H_{FC}$ 59. That is, the height of the first tool component 50' varies over the length $L_{FC}$ 88 of the first tool component 50.

As illustrated, the first surface 60 comprises a desired tool inner mold line 70' for a composite part 15. As illustrated, the first surface 60 of the first tool component 50' comprises a non-planar surface. The second surface 80 of the first tool component 50' comprises a planar surface.

The second surface 80 of the first tool component 50' is configured to interface with the second tool component 100. As illustrated, the first surface 120 of the second tool component 100 comprises a top surface of the second tool component 100. As also illustrated, the first tool component 50' comprises a plurality of compressible areas 74A'-D'. As previously described, such internal compressible areas 74A'-D' are provided in order to respond to the different thermal expansion created by the different materials used for the first and second surfaces 60, 80 of the first tool component 50' without absorbing all of the thermal difference as tool-internal strain during a cure. In this illustrated gradient tool 20', such internal compressible areas 74A'-D' are provided along a first portion 112 and a second portion 114 of the first tool component 50'. As illustrated, the first and second portions 112, 114 comprise portions of the first tool component 50' having larger heights.

The presently disclosed embodiments of the gradient tool provide a number of advantages. For example, matching the thermal expansion of the part to the first tool component may reduce the spring-in and other cure-induced deformation of parts that can arise during composite part manufacturing. This, in turn, may reduce scrap rates for composite part manufacturers and therefore may reduce overall manufacturing costs. Another advantage of the presently disclosed gradient tools is that they may provide a cost effective tool that matches the thermal expansion of the composite part where the tool interfaces the composite part. This result may be achieved while the gradient tool still provides appropriate support of the part and not requiring the tool to match the thermal expansion of the part where the tool does not interface the part, such as in the tool cart structure.

Another advantage of the presently disclosed gradient tool is that the first tool component and second tool component may be fabricated such that they could be replaced independent of each other. This may present a number of advantages. For example, gradient tool interchangeability may benefit research when a part is fabricated by way of several different material systems. The herein-described gradient tool may also present manufacturing advantages by allowing replacement of only the first tool component or the second tool component as these tool components may wear at different rates.

Figures 4, 5:
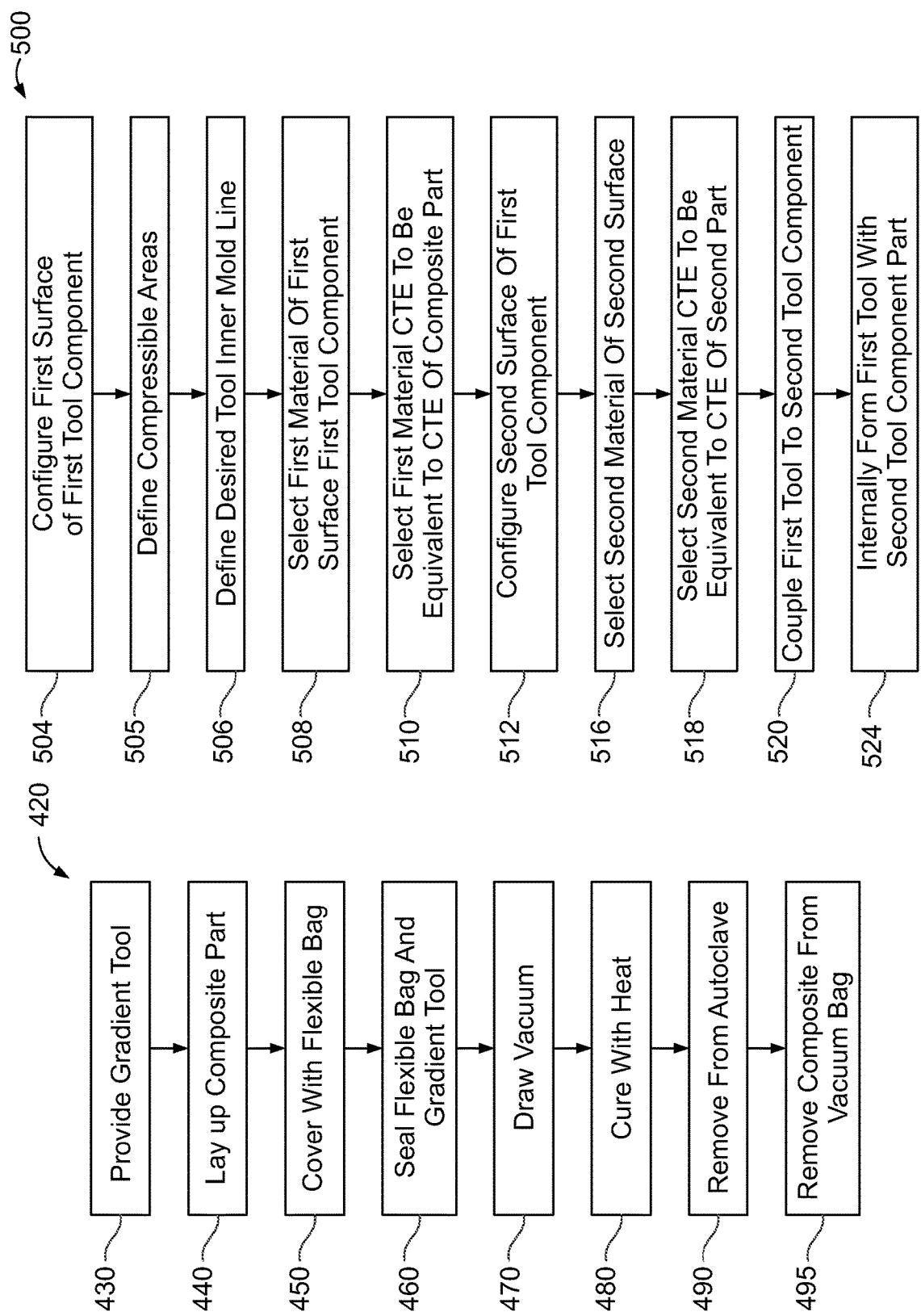
FIG. 4 illustrates steps of a method of autoclave curing using a gradient tool, such as the gradient tool disclosed herein.
FIG. 5 illustrates steps of a method of fabricating a gradient tool, such as the gradient tool disclosed herein.

Attention is now directed to FIG. 4 which illustrates the steps of a method 420 of fabricating a composite part, using the herein described the gradient tools 20, 20' comprising a first tool component 50, 50' and a second tool component 100, as shown in FIGS. 1 and 3. Beginning at step 430, a gradient tool 20 and/or 20' is provided. In one arrangement, the gradient tool 20, 20' comprises a first tool component 50, 50' coupled to a second tool component 100. In one arrangement, the first tool component 50, 50' is integrally formed as one-piece with the second tool component 100.

At step 440, composite part 15 is laid up or assembled on a first surface 60, 60' of a gradient tool 20. Lay up of the composite part 15 may take place by way of conventional ply layup techniques, the composite part 15 may have one or more simple or complex contoured part surfaces. In one preferred arrangement, the composite part 15 may be laid up manually. In an alternative arrangement, the composite part 15 may be laid up using advanced fiber placement ("AFP") or automated tape laying ("ATP") manufacturing methods (or by any other known method) in the desired positions and orientations as determined during the composite laminate specification and design phase.

At step 450, the composite part 15, along with the gradient tool 20 and/or 20' are covered with a flexible bag 25 such as a vacuum bag. At step 460, the flexible bag 25 is then sealed to the gradient tool 20 and the composite part 15.

At step 470, a vacuum is drawn in the flexible bag 25 by way of a vacuum source, such as source 32 in FIG. 1. This created vacuum forces the flexible bag 25 down onto a top surface of the composite part 15 in order to compact and/or consolidate the composite part 15.

At step 480, the vacuum bagged composite part 15 is cured with heat. For example, at step 480, the vacuum bagged composite part 15 may be placed within a conventional or surface-heating systems, such as those found in autoclave 30. Curing in such a conventional heating system will heat the composite part 15 from the outside in, as heat energy is transferred through a thickness of the composite part 15. The process duration of a thorough cure, therefore, is determined by the rate of heat flow into the composite part 15. As such, the flow rate depends on the specific heat, thermal conductivity, density, and viscosity of the material(s) used in the composite part 15. With certain convection heating systems, the composite part 15 may heat at an uneven rate, which can stress the final cured laminate. Therefore, the temperature in the autoclave 30 and a convection heating source is typically ramped up and down slowly in an attempt to minimize part stress. Heating the composite part 15 to a predetermined temperature changes a shape of the first surface 64 of the first tool component 50,50' at a first rate dependent on a first CTE 66 of the first surface 64. Heating also changes a shape of a second surface 84 of the first tool component 50, 50' at a second rate dependent on a second CTE 90 of the second surface 84.

After the heating step 480 has taken place, at step 490, the flexible bag 25, having the composite part 15 therein, is removed from the autoclave.

At the end of this curing process, the composite part 15 is substantially cured and the plies within the composite part 15 are consolidated so as to form a continuous, cured composite laminate. At step 490, the cured composite part 15 may be removed from the flexible bag 25. Thereafter, the cured composite part 15 is allowed to cool before any further finishing processing steps take place.

FIG. 5 illustrates a method 500 of fabricating a gradient tool 20 (shown in FIGS. 1 and 3) and/or gradient tool 20' (shown in FIG. 3) comprising a first tool component 50, 50' and/or 50' and a second tool component 100. As illustrated, the method 500 comprises an initial step 504 of configuring a first surface 60 of a first tool component 50, 50' to interface with a bottom surface 17 of a composite part 15. In one arrangement, the first tool component 50, 50' may be fabricated by sputtering, additive manufacturing, successive electroplating, or machining.

At optional step 505, the method 500 may include the step of defining at least one compressible area 74 within the first tool component 50, 50'.

At optional step 506, the method 500 may include the step of defining a desired tool inner mold line 70 along the first surface 60 of the first tool component 50, 50'.

At step 508, the method 500 includes the step of selecting a first material 64 of the first surface 60 of the first tool component 50, 50'. Specifically, the first material 64 may be chosen to have the first CTE 66.

At optional step 510, the method 500 comprises the step of selecting the first material 64 of the first surface 60 of the first tool component 50, such that the first CTE 66 of the first material 64 is generally equivalent to the CTE 18 of the composite part 15 that is configured to interface with the first surface 60 of the first tool component 50.

Then, at step 512, the method 500 includes the step of configuring a second surface 80 of the first tool component 50, 50' to interface with a second tool component 100. In one arrangement, the method may include the step of fabricating the second tool component 100 by injection molding, additive manufacturing, or subtractive manufacturing.

Then at step 516, the method 500 includes the step of selecting a second material 84 of the second surface 80 of the first tool component 50, 50' wherein the second material 84 has the second CTE 90. Specifically, the second CTE 90 may be selected to have a different CTE than the first CTE 66 of the first material 64.

At optional step 518, the method includes the step of selecting the second material 84 of the second surface 80 of the first tool component 50, 50', such that the second CTE 90 of the second material 84 is generally equivalent to the CTE 128 of the second component part 100.

At optional step 520, the method 500 may include the step of coupling the first tool component 50, 50' to the second tool component 100 such that the second surface 80 of the first tool component 50, 50' is adjacent the first surface 120 of the second tool component 100.

At optional step 524, the method may comprise the step of integrally forming the first tool component 50 as one-piece with the second tool component 100. Step 524 is an alternative step to step 520.

Figure 6:
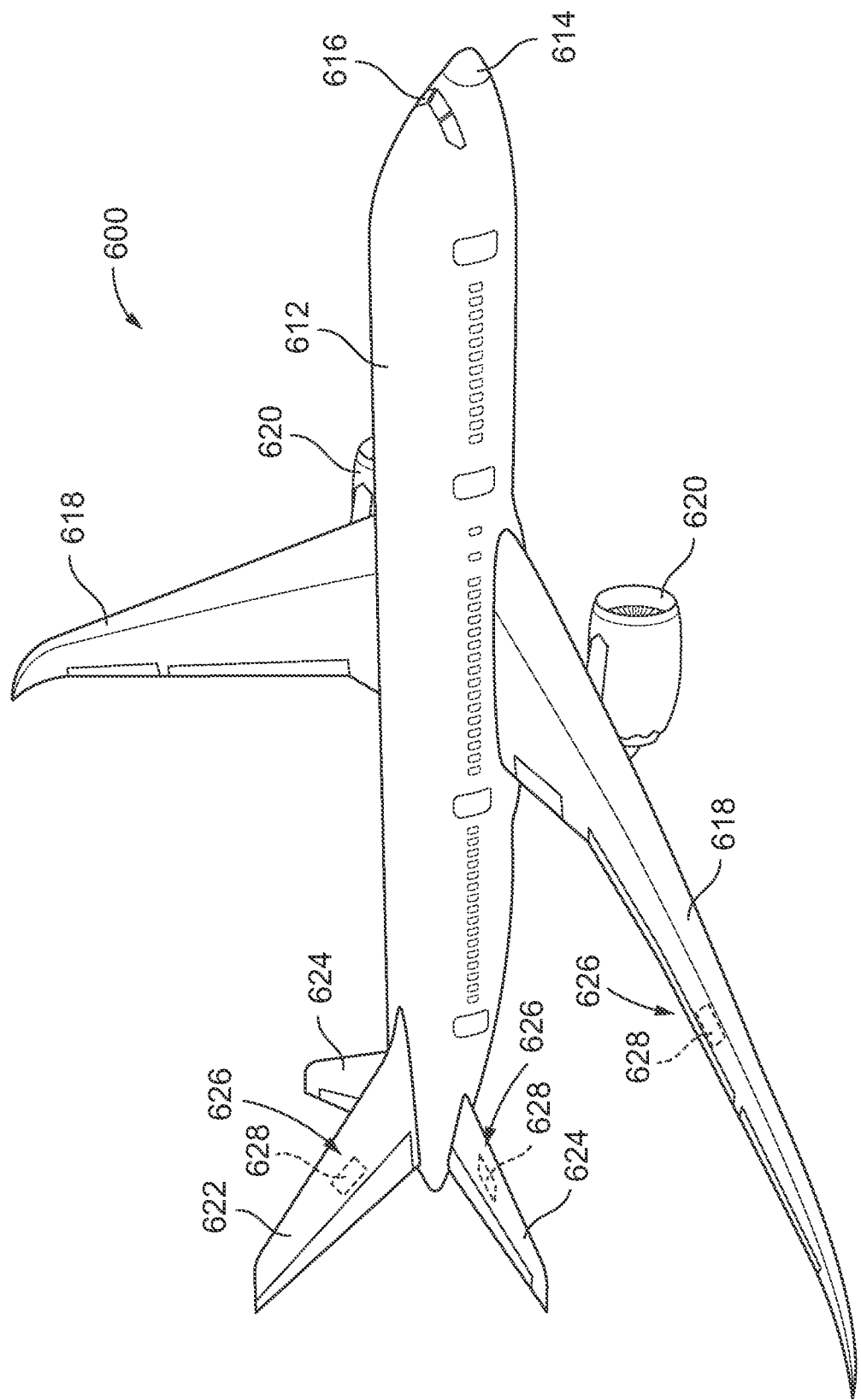
FIG. 6 is a diagrammatic representation of a perspective view of an aircraft that may incorporate one or more composite laminate structures manufactured in accordance with one or more embodiments disclosed herein.

FIG. 6 is an illustration of a perspective view of an aircraft 600 that may incorporate one or more composite parts 15 or structures manufactured using the gradient tool system 10 of the present disclosure. As shown in FIG. 6, the aircraft 600 comprises a fuselage 612, a nose 614, a cockpit 616, wings 618 coupled to the fuselage 612, one or more propulsion units 620, a tail vertical stabilizer 622, and one or more tail horizontal stabilizers 624. Although the aircraft 600 shown in FIG. 6 is generally representative of a commercial passenger aircraft, the one or more composite laminate parts, as disclosed herein, may also be employed in other types of aircraft or air vehicles. More specifically, the teachings of the disclosed embodiments may be applied to other passenger aircraft, cargo aircraft, military aircraft, rotorcraft, and other types of aircraft or aerial vehicles, as well as aerospace vehicles, satellites, space launch vehicles, rockets, and other aerospace vehicles. It may also be appreciated that embodiments of tools and methods in accordance with the disclosure may be utilized in other transport vehicles, such as boats and other watercraft, trains, automobiles, trucks, buses, or other suitable transport vehicles formed from or utilizing the composite laminates as disclosed herein.

Figure 7:
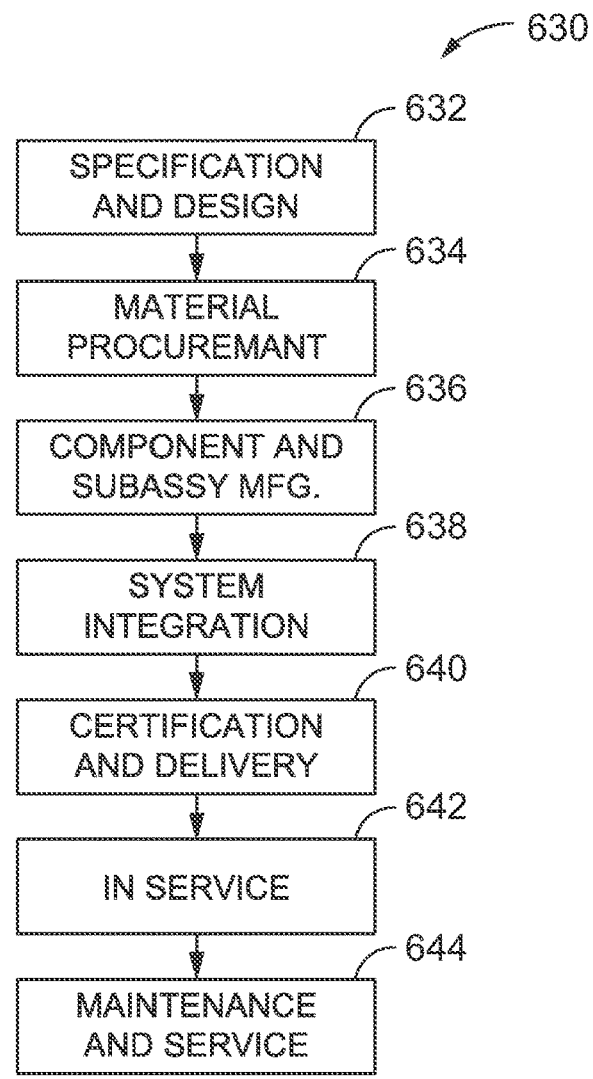
FIG. 7 is a diagrammatic representation of a flow diagram of aircraft production and service methodology.

Embodiments of the disclosure may find use in a variety of potential applications, particularly in the transportation industry, including for example, aerospace, marine, automotive applications and other application where composite structures may be used. Therefore, referring now to FIGS. 7 and 8, embodiments of the disclosure may be used in the context of an aircraft manufacturing and service method 630 as shown in FIG. 6 and the aircraft 600 as shown in FIG. 7. Aircraft applications of the disclosed embodiments may include, for example, without limitation, the design and fabrication of composite laminates fabricated by way of one or more of the various gradient tools as disclosed herein.

During pre-production, exemplary method 630 may include specification and design 632 of the aircraft 600 and material procurement 634. As just one example, for the specification and design of the aircraft related composite laminate parts, the desired engineering characteristics of the gradient tool may be determined at this step. This might include the selection of the materials to be used for the first and second surfaces of the first tool component, along with the materials' desired CTE. This might also include a determination of whether certain compressible areas will be used in the first tool component. Where it is decided that certain compressible areas are to be used, the desired shape, location, and placement of the compressible areas may be determined at this step.

As another example, during this specification and design step, in one particular gradient tool, the type of material for use in the second tool component may be selected. In yet another example, during this specification and design step, the thickness of the first tool component and its various surfaces and materials may be determined. In addition, during this specification and design step, the coefficient of thermal expansion of the various materials to be used for both the first and second tool components may be determined. As just another example, at this design step, the mechanism for coupling the first and second tool component may be determined. At this step, it may also be determined how the first tool component will be manufactured.

During production, component and subassembly manufacturing 636, such as the manufacturing of a composite part utilizing the gradient tool as disclosure herein, takes place. During production, system integration 638 of the aircraft 600 also takes place. After such a component and subassembly manufacturing step, the aircraft 600 may go through certification and delivery 640 in order to be placed in service 642. While in service by a customer, the aircraft 600 is scheduled for routine maintenance and service 644, which may also include modification, reconfiguration, refurbishment, and so on.

Each of the process steps of method 630 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

Figure 8:
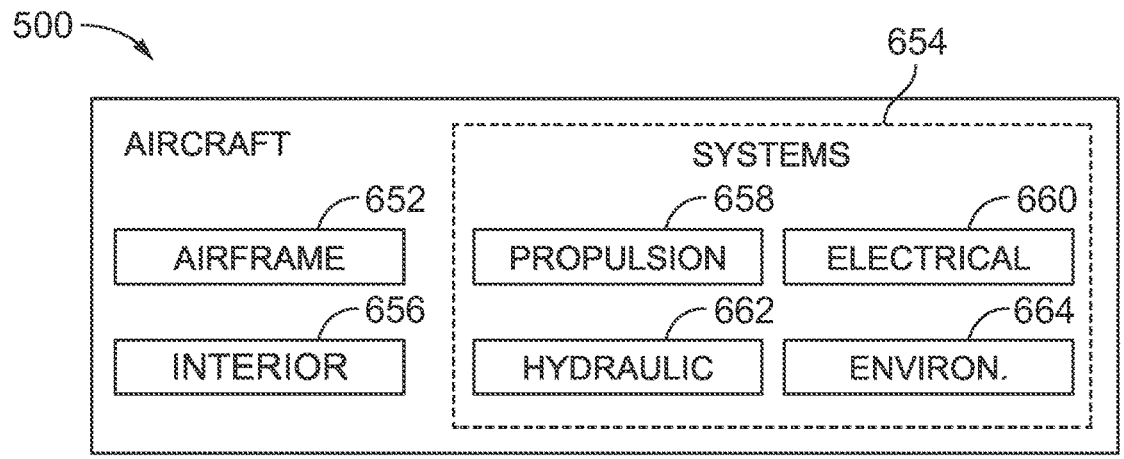
FIG. 8 is a diagrammatic representation of a block diagram of an aircraft.

As shown in FIG. 8, the aircraft 600 produced by exemplary method 630 may include an airframe 652 with a plurality of high-level systems 654 and an interior 656. Examples of high-level systems 654 may include one or more of a propulsion system 658, an electrical system 660, a hydraulic system 662, and an environmental system 664. Any number of other systems may be included. Although an aerospace example is shown, the principles of the disclosure may be applied to other industries, such as the marine and automotive industries.

Tools and methods embodied herein may be employed during any one or more of the stages of the production and service method 630. For example, components or subassemblies corresponding to production process may be fabricated or manufactured in a manner similar to components or subassemblies produced while the aircraft 600 is in service. Also, one or more apparatus embodiments, method embodiments, or a combination thereof may be utilized during the production stages 632 and 634, for example, by substantially expediting assembly of or reducing the cost of an aircraft 600. Similarly, one or more of apparatus embodiments, method embodiments, or a combination thereof may be utilized while the aircraft 600 is in service, for example and without limitation, to maintenance and service 644.

Further, the disclosure comprises embodiments according to the following clauses:

Clause 1. A gradient tool for forming a part, the gradient tool comprising:
a first tool component comprising a first surface and a second surface, the first surface comprising a first material having a first coefficient of thermal expansion (CTE), and the second surface comprising a second material having a second CTE,
wherein the first CTE of the first material is different than the second CTE of the second material.

Clause 2: The gradient tool of clause 1, wherein the first CTE of the first material is lower than the second CTE of the second material.

Clause 3: The gradient tool of clause 1, further comprising: a second tool component comprising a first surface, wherein the second tool component is formed from a third material having a third CTE.

Clause 4: The gradient tool of clause 3, wherein the first surface of the second tool component comprises a geometrical surface structure similar to a geometrical surface structure of the first surface of the first tool component.

Clause 5: The gradient tool of clause 3, wherein the third CTE of the third material of the second tool component is substantially equal to the second CTE of the second material of the first tool component.

Clause 6: The gradient tool of clause 3, wherein the first tool component is formed integrally with the second tool component.

Clause 7: The gradient tool of clause 1, wherein the first tool component is coupled to the second tool component such that a second surface of the first tool component is adjacent a first surface of the second tool component.

Clause 8: The gradient tool of clause 7, wherein the first tool component is coupled to the second tool component by adhering, gluing, mechanically interlocking, thermally interlocking, or being held together by gravity.

Clause 9: The gradient tool of clause 1, wherein the first CTE of the first material of the first tool component is substantially equal to a fourth CTE of the part.

Clause 10: The gradient tool of clause 1, wherein the first surface of the first tool component has a geometrical surface structure to match a geometrical surface structure of the part.

Clause 11: The gradient tool of clause 1, wherein the second surface of the first tool component has a geometrical surface structure to match a geometrical surface structure of the part.

Clause 12: The gradient tool of clause 1, wherein the first tool component comprises at least one compressible area defined therein.

Clause 13: The gradient tool of clause 1, wherein at least one of a third material of a second tool component and the second material of the first tool component comprises aluminum.

Clause 14: The gradient tool of clause 1, wherein the third material of the second tool component comprises an aluminum alloy.

Clause 15: The gradient tool of clause 1, wherein the first tool component comprises a non-constant height.

Clause 16: A method of manufacturing a composite part using a gradient tool comprising a first tool component, the method comprising the steps of:
laying up a composite part along a first surface of the first tool component of the gradient tool;
sealing a vacuum bag over the composite part;
drawing a vacuum in the vacuum bag so as to compact the composite part;
heating the composite part to a predetermined temperature;
changing a shape of the first surface of the first tool component at a first rate dependent on a first Coefficient of Thermal Expansion (CTE) of the first surface, and
changing a shape of a second surface of the first tool component at a second rate dependent on a second CTE of the second surface,
the second CTE of the second surface different than the first CTE of the first surface.

Clause 17: The method of clause 16 further comprising the step of: causing thermal stresses within the first tool component based on the different first CTE and second CTE of the first tool component.

Clause 18: The method of clause 16 further comprising the step of: compressing at least one compressible area defined by the first tool component so as to respond to the difference of thermal expansion between the first surface and the second surface of the first tool component.

Clause 19: The method of clause 16 further comprising the step of integrally forming the first tool component as one-piece with the second tool component.

Clause 20: A method of fabricating a gradient tool comprising a first tool component and a second tool component, the method comprising the steps of:
configuring a first surface of a first tool component to interface with a bottom surface of a composite part;
selecting a first material of the first surface of the first tool component, the first material having a first coefficient of thermal expansion (CTE);
configuring a second surface of the first tool component to interface with a second tool component; and
selecting a second material of the second surface of the first tool component wherein the second material has a second coefficient of thermal expansion (CTE),
wherein the second coefficient of thermal expansion (CTE) is different than the first coefficient of thermal expansion of the first material.

Clause 21: The method of clause 20 further comprising the step of: defining a desired tool inner mold line along the first surface of the first tool component.

Clause 22: The method of clause 20 further comprising the step of: selecting the first material of the first surface of the first tool component, such that the first coefficient of thermal expansion (CTE) of the first material is generally equivalent to a coefficient of thermal expansion (CTE) of the composite part that is configured to interface with the first surface of the first tool component.

Clause 23: The method of clause 20 further comprising the step of: selecting the second material of the second surface of the first tool component, such that the second coefficient of thermal expansion (CTE) of the second material is generally equivalent to a coefficient of thermal expansion (CTE) of the second component part.

Clause 24: The method of clause 20 further comprising the step of fabricating the first tool component by sputtering, additive manufacturing, successive electroplating, or machining.

Clause 25: The method of clause 20 further comprising the step of fabricating the second tool component by injection molding, additive manufacturing, or subtractive manufacturing.

Clause 26: The method of clause 20 further comprising the step of: defining at least compressible area within the first tool component.

Clause 27: The method of clause 20 further comprising the step of coupling the first tool component to the second tool component such that the second surface of the first tool component is adjacent the first surface of the second tool component.

Clause 28: The method of clause 20 further comprising the step of integrally forming the first tool component as one-piece with the second tool component.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

We claim:

1. A gradient tool for forming a part, the gradient tool comprising:
a first tool component comprising a first surface and a second surface, wherein the first surface of the first tool component comprises a first material having a first coefficient of thermal expansion (CTE), wherein the second surface of the first tool component comprises a second material having a second CTE, wherein the first CTE of the first material is different than the second CTE of the second material, and wherein the first material comprises an aluminum-nickel alloy and the second material comprises aluminum; and
a second tool component comprising a first surface, wherein the first surface of the second tool component comprises a third material having a third CTE, wherein the first tool component is removably coupled to the second tool component, and wherein the third CTE of the third material of the first surface of the second tool component is substantially equal to the second CTE of the second material of the second surface of the first tool component.

2. The gradient tool of claim 1, wherein the first CTE of the first material is lower than the second CTE of the second material.

3. The gradient tool of claim 1, wherein the first tool component is removably coupled to the second tool component such that the second surface of the first tool component is adjacent the first surface of the second tool component.

4. The gradient tool of claim 1, wherein the first CTE of the first material of the first tool component is substantially equal to a fourth CTE of the part.

5. The gradient tool of claim 1, wherein the first surface of the first tool component has a geometrical surface structure to match a geometrical surface structure of the part.

6. The gradient tool of claim 1, wherein the second surface of the first tool component has a geometrical surface structure to match a geometrical surface structure of the first surface of the second tool component.

7. The gradient tool of claim 1, wherein the third material of the second tool component comprises aluminum.

8. The gradient tool of claim 1, further comprising at least one compressible area, wherein the at least one compressible area is an open or a closed cell.

9. The gradient tool of claim 1, further comprising a plurality of compressible areas.

10. The gradient tool of claim 1, third material of the second tool component is different than the second material of the first tool component.

11. The gradient tool of claim 1, further comprising at least one compressible area, wherein the at least one compressible area contains a gas.

12. A method of manufacturing a composite part using the gradient tool of claim 1, the method comprising the steps of:
laying up a composite part along the first surface of the first tool component of the gradient tool:
sealing a vacuum bag over the composite part;
drawing a vacuum in the vacuum bag so as to compact the composite part;
heating the composite part to a predetermined temperature;
changing a shape of the first surface of the first tool component at a first rate dependent on the first CTE of the first surface, and
changing a shape of the second surface of the first tool component at a second rate dependent on the second CTE of the second surface.

13. The method of claim 12 further comprising the step of causing thermal stresses within the first tool component based on the different first CTE and second CTE of the first tool component.

14. The method of claim 13 further comprising the step of: compressing a plurality of compressible areas defined by the first tool component so as to respond to the difference of thermal expansion between the first surface and the second surface of the first tool component.

15. A method of fabricating the gradient tool of claim 1, the method comprising the steps of:
selecting the first material of the first surface of the first tool component, the first material having the first CTE;
configuring the second surface of the first tool component to interface with the second tool component; and
selecting the second material of the second surface of the first tool component wherein the second material has the second CTE.

16. The method of claim 15 further comprising the step of: defining a desired tool inner mold line along the first surface of the first tool component.

17. The method of claim 15 further comprising the step of: selecting the first material of the first surface of the first tool component, such that the first CTE of the first material is generally equivalent to a CTE of a composite part that is configured to interface with the first surface of the first tool component.

18. The method of claim 15 further comprising the step of: selecting the second material of the second surface of the first tool component, such that the second CTE of the second material is generally equivalent to a CTE of the second component part.

19. The method of claim 15 further comprising the step of: coupling the first tool component to the second tool component such that the second surface of the first tool component is adjacent the first surface of the second tool component.

20. The method of claim 15 further comprising the step of: configuring the first surface of the first tool component to interface with a bottom surface of a composite part.

\* \* \* \* \*